United States Patent
Zimmerman

(10) Patent No.: US 11,813,902 B1
(45) Date of Patent: Nov. 14, 2023

(54) WHEEL TRACTION DEVICE

(71) Applicant: Alan Zimmerman, Lexington, NE (US)

(72) Inventor: Alan Zimmerman, Lexington, NE (US)

( * ) Notice: Subject to any disclaimer, the term of this patent is extended or adjusted under 35 U.S.C. 154(b) by 429 days.

(21) Appl. No.: 16/913,353

(22) Filed: Jun. 26, 2020

Related U.S. Application Data

(60) Provisional application No. 62/866,989, filed on Jun. 26, 2019.

(51) Int. Cl.
    *B60C 27/02*     (2006.01)

(52) U.S. Cl.
    CPC ...... *B60C 27/0276* (2013.01); *B60C 27/0215* (2013.01); *B60C 27/0238* (2013.01); *B60C 27/0269* (2013.01)

(58) Field of Classification Search
    CPC . B60C 27/02; B60C 27/0207; B60C 27/0215; B60C 27/0238; B60C 27/0269; B60C 27/0276; B60C 27/04
    See application file for complete search history.

(56) References Cited

U.S. PATENT DOCUMENTS

| | | | | |
|---|---|---|---|---|
| 1,493,461 A * | 5/1924 | Boyer | ...................... | B60C 27/04 152/228 |
| 1,587,283 A * | 6/1926 | Carey | ...................... | B60C 27/02 152/236 |
| 2,514,243 A * | 7/1950 | Iandiorio | ................. | B60C 27/12 152/233 |
| 3,426,824 A * | 2/1969 | Mazzella | ................ | B60C 27/02 152/225 R |
| 4,116,254 A * | 9/1978 | Seip | ..................... | B60C 27/0276 152/233 |
| 4,155,389 A * | 5/1979 | Dwinell | .................. | B60C 27/06 152/219 |
| 4,411,301 A * | 10/1983 | Bindel | .................... | B60C 27/02 152/213 R |
| 4,836,259 A * | 6/1989 | Lewin | ..................... | B60C 27/02 152/243 |
| 5,318,087 A * | 6/1994 | Chang Gun | ............ | B60C 27/08 152/219 |
| 6,009,922 A * | 1/2000 | Gogan | .................... | B60C 27/02 152/218 |
| 6,581,661 B1 * | 6/2003 | Morrison | ................ | B60C 27/02 152/232 |

\* cited by examiner

*Primary Examiner* — Jason R Bellinger
(74) *Attorney, Agent, or Firm* — Suiter Swantz pc llo

(57) ABSTRACT

A wheel traction device may include, but is not limited to, a linkage configured to at least partially encircle a ground-engaging surface of a vehicle wheel; and an adjustment assembly coupled to the linkage, the adjustment assembly configured to apply a tension to the linkage. Further, a wheel traction device may include, but is not limited to, a linkage configured to at least partially encircle a ground-engaging surface of a vehicle wheel; and a traction segment configured to be retained against the ground-engaging surface of the vehicle wheel by the linkage.

11 Claims, 9 Drawing Sheets

WHEEL TRACTION DEVICE

CROSS-REFERENCE TO RELATED APPLICATIONS

The present application claims priority under 35 U.S.C. § 119 to U.S. Provisional Patent Application Ser. No. 62/866,989, filed Jun. 26, 2020, entitled Tire CHAIN DEVICE APPLIED TO TIRE, naming Alan Zimmerman as inventor, which is incorporated herein by reference in the entirety.

TECHNICAL FIELD

The present disclosure generally relates to the field of wheel traction devices configured to enhance wheel traction of a vehicle.

BRIEF DESCRIPTION OF THE DRAWINGS

The numerous advantages of the disclosure may be better understood by those skilled in the art by reference to the accompanying figures in which.

DETAILED DESCRIPTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Reference will now be made in detail to the subject matter disclosed, which is illustrated in the accompanying drawings. Referring generally to FIGS. 1 through 9, embodiments of the present disclosure are generally directed to a wheel traction device 100.

Figure 1:
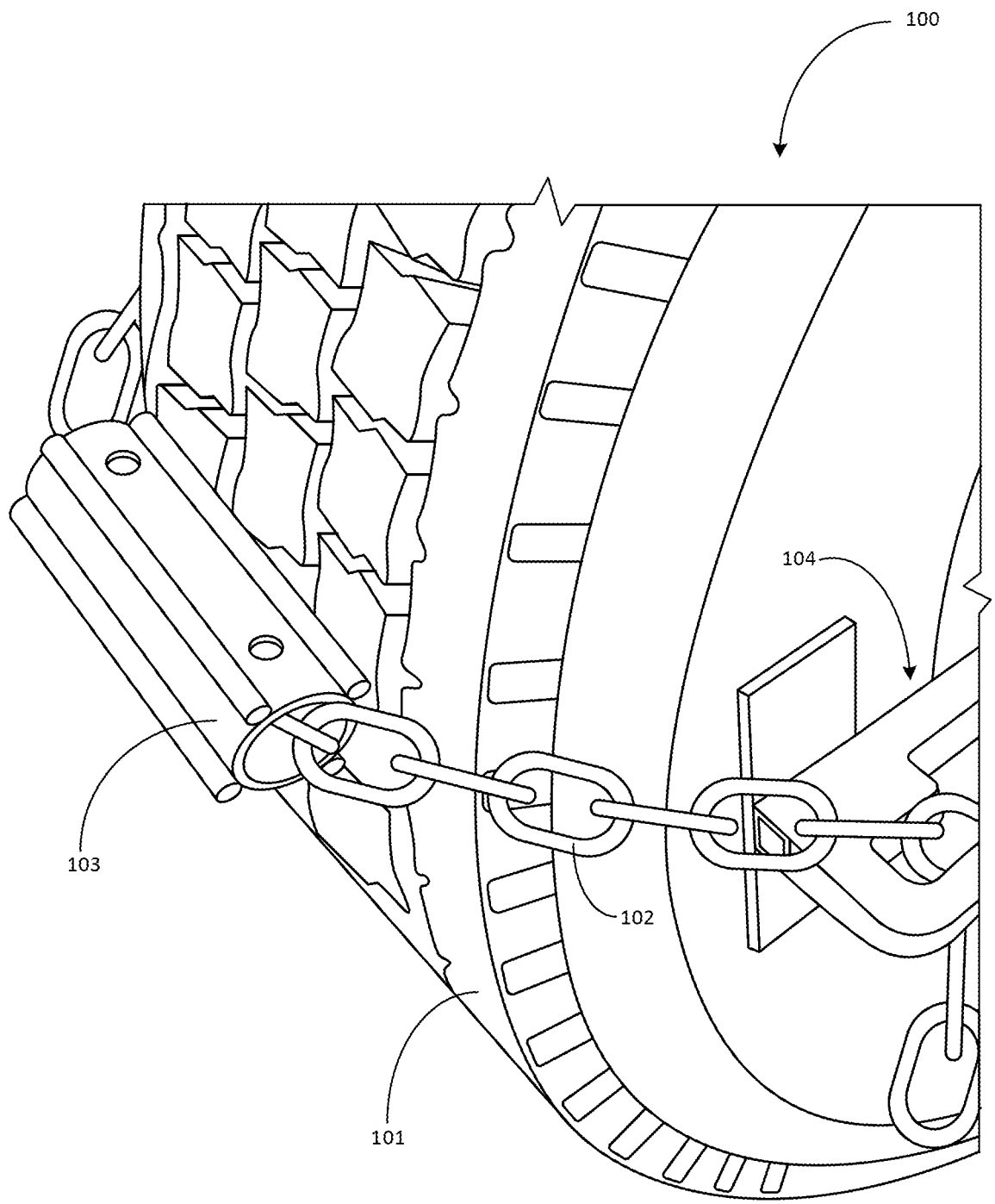
FIG. 1 shows components of a wheel traction system.
Figure 2:
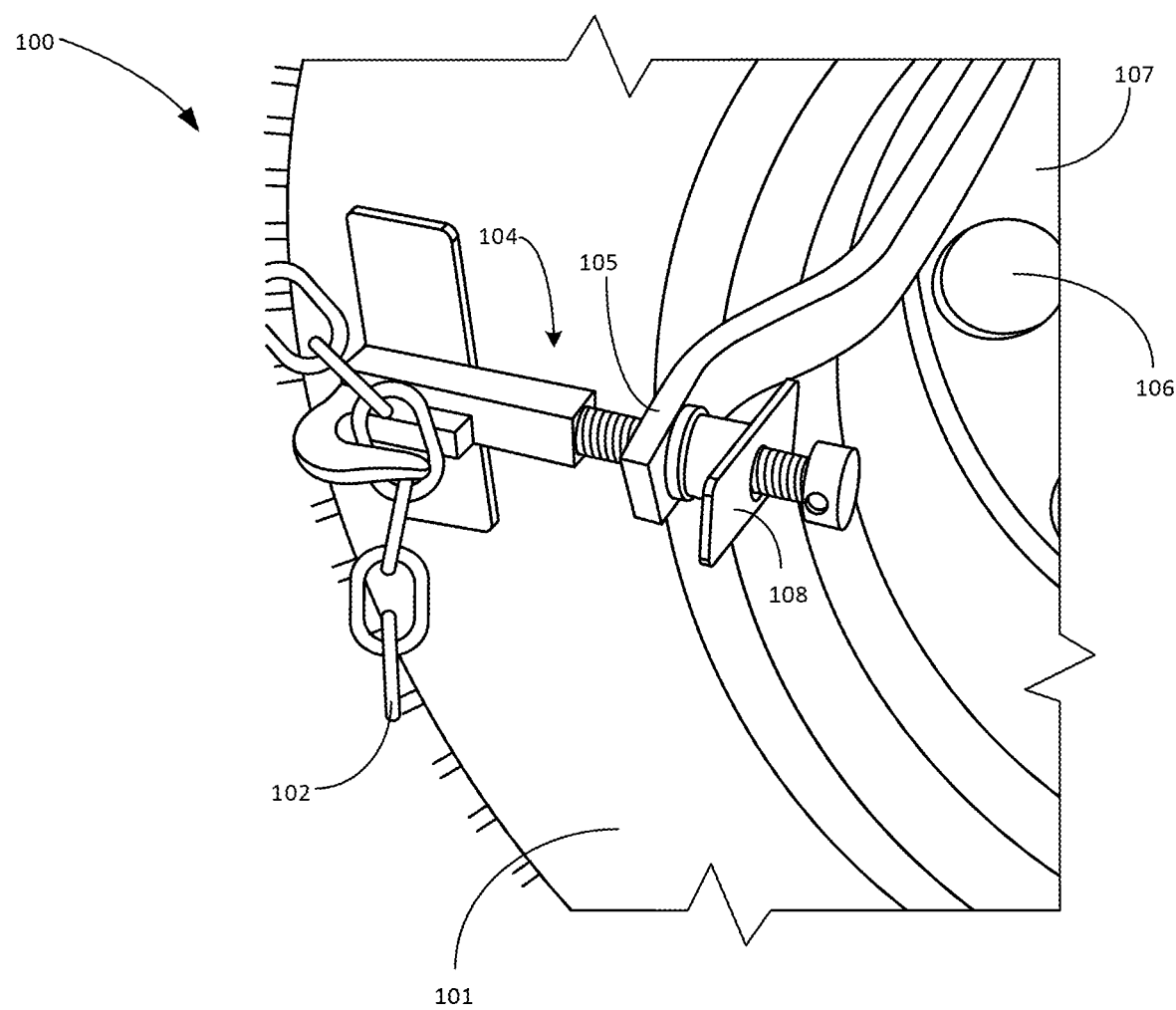
FIG. 2 shows components of a wheel traction system.

Referring to FIGS. 1 and 2, a wheel traction device 100 is shown. The wheel traction device 100 may, for example, be affixed to a wheel assembly 101 (e.g., a tire mounted on a wheel) of a vehicle (e.g. a car, pickup truck, semi-truck, construction machinery, and the like) to enhance the traction capabilities of the vehicle. For example, in a case where a vehicle become stuck in snow or mud, the wheel traction device 100 may be coupled to the wheel assembly 101 such that one or more components of the wheel traction device 100 (e.g. a linkage 102 and/or a traction segment 103) are disposed adjacent to a ground-engaging surface (e.g., a tire) of the wheel assembly 101. The linkage 102 may include any flexible, durable line-type structure such as a chain (e.g. a ⅜" G70 cargo chain), steel cable, rope, and the like. The traction segment 103 may be configured to encircle or couple to the linkage 102 such that it is retained in a relatively static position relative to the wheel assembly 101 but the linkage 102. When the wheel assembly 101 rotates, the linkage 102 and/or the traction segment 103 may be brought into contact with the ground surface thereby providing additional frictional force between the wheel assembly 101 and the ground surface so as to counteract any slippage due to snow or mud on the ground surface.

Figure 8:
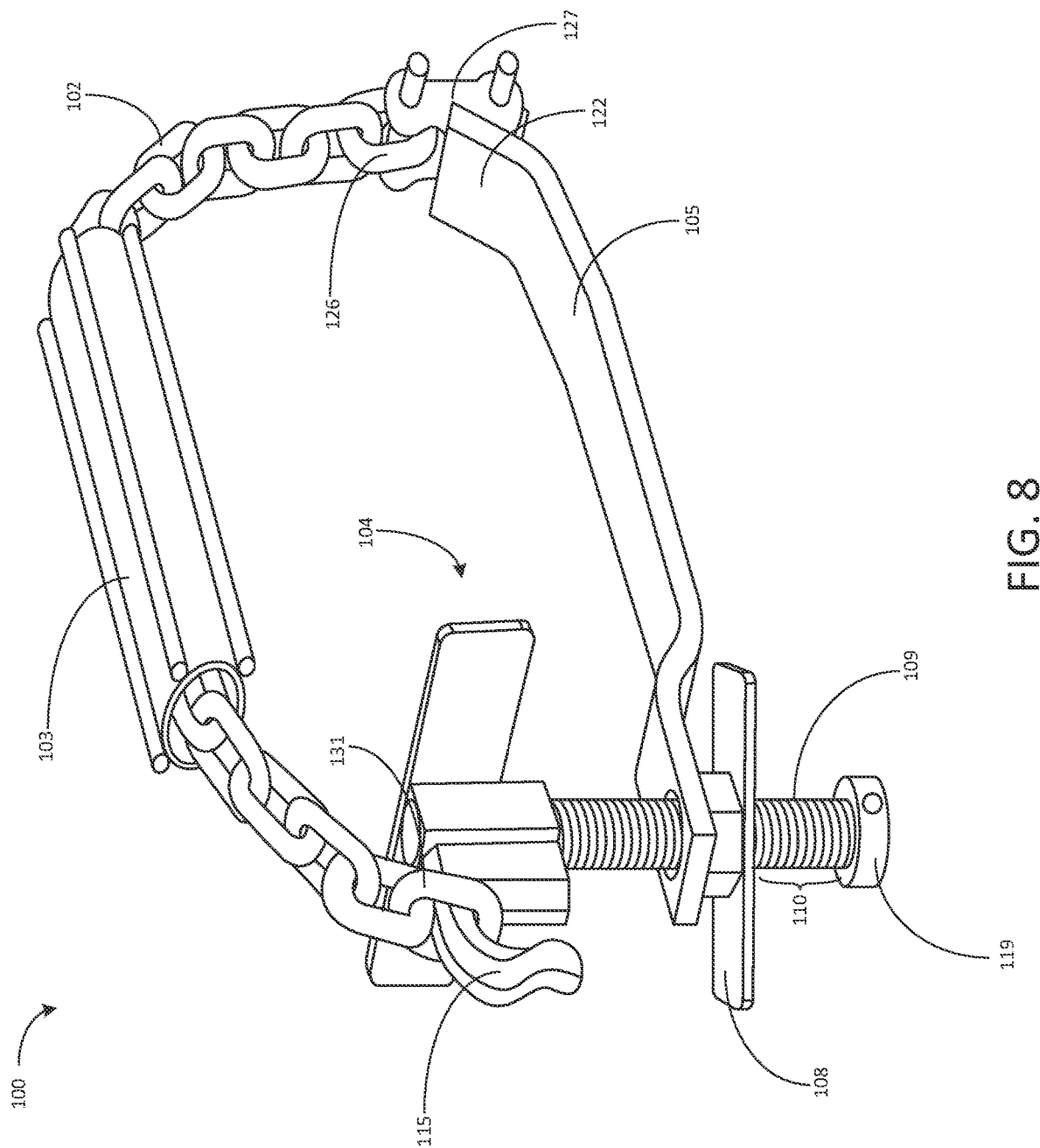
FIG. 8 shows components of a wheel traction system.

Referring to FIGS. 1-4, the wheel traction device 100 may further include an adjustment assembly 104 and a stabilization bar 105. The adjustment assembly 104, the stabilization bar 105 and the linkage 102 may be coupled together so as to encircle the wheel assembly 101. As shown in FIG. 1, for example, the stabilization bar 105 may be routed through a wheel assembly 101 via an opening 106 in a wheel disk 107 on which the wheel assembly 101 is disposed. As shown in FIG. 2, the linkage 102 may then be routed around the outside of the wheel assembly 101. The adjustment assembly 104 may then be coupled to a second end of the linkage 102. Finally the adjustment assembly 104 may be coupled to a second end of the stabilization bar 105. As shown in FIGS. 1 and 8, the length of the combined linkage 102, adjustment assembly 104, stabilization bar 105 may be further adjusted via movement of an adjustment handle 108 of the adjustment assembly 104 to apply tension to the linkage 102 so as to retain the linkage 102 and/or the traction segment 103 tight against the wheel assembly 101.

Figure 3:
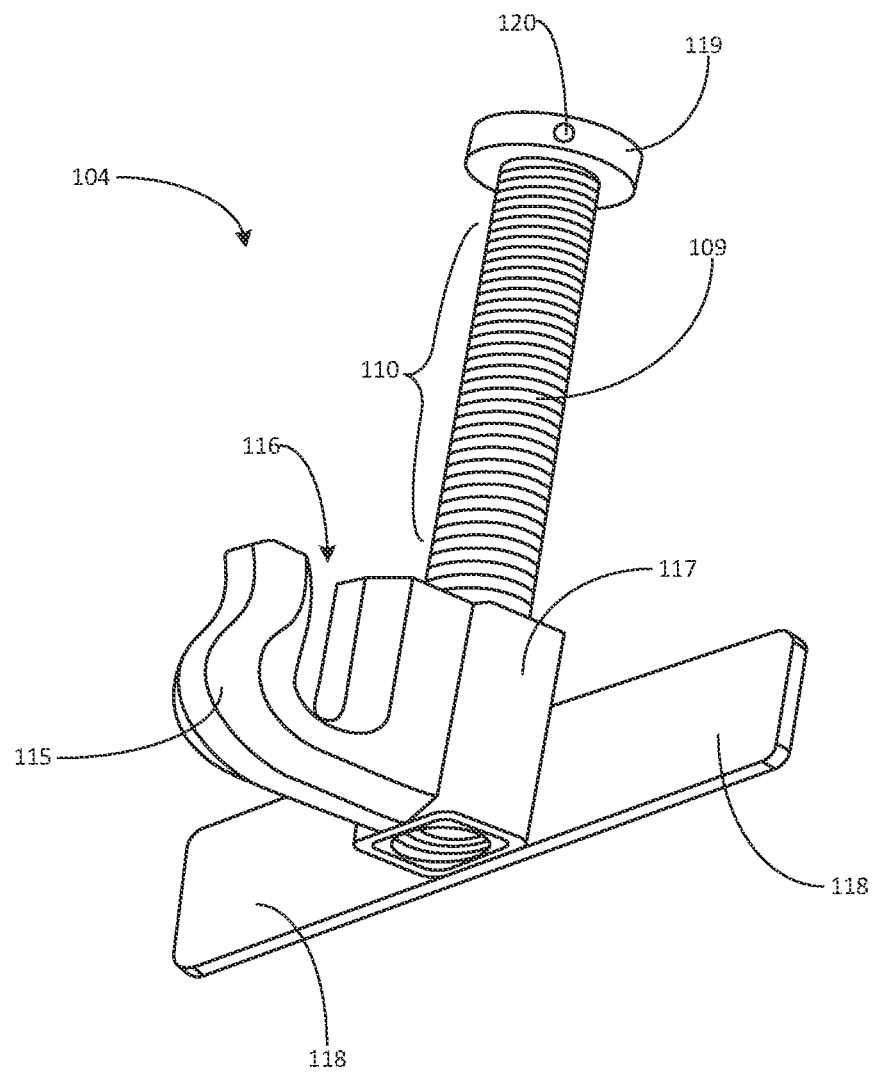
FIG. 3 shows components of a wheel traction system.
Figure 4:
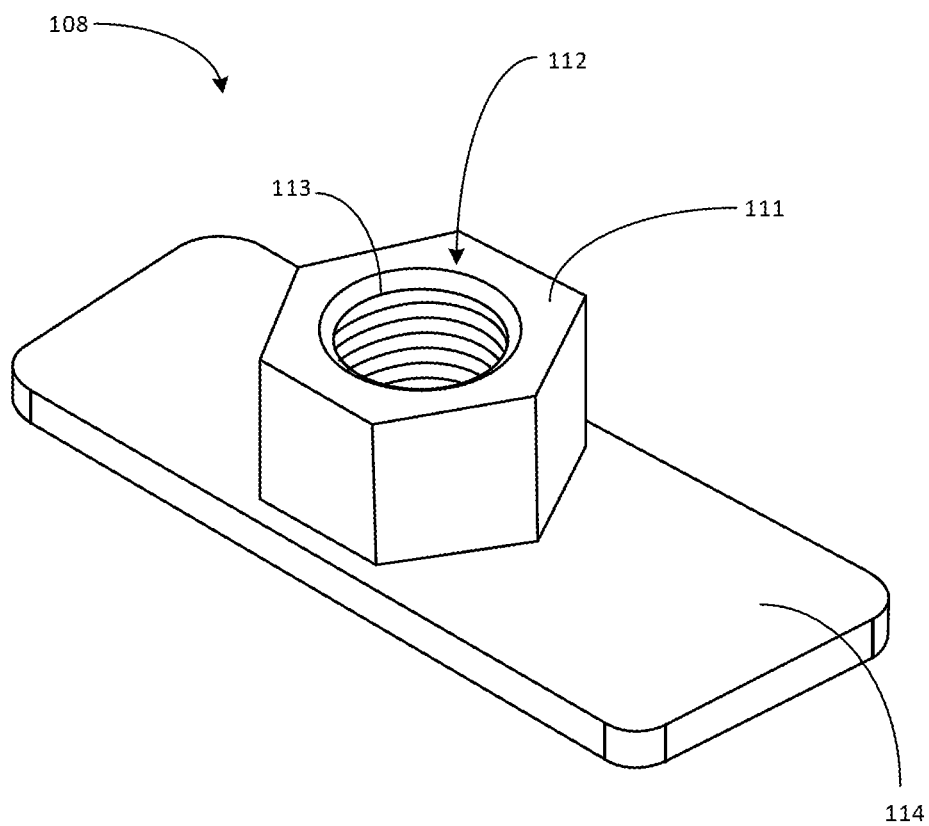
FIG. 4 shows components of a wheel traction system.

Specifically, referring to FIG. 3, the adjustment assembly 104 may include a shaft portion 109. At least a portion of the shaft portion 109 may include exterior threading 110. Referring to FIG. 4, the adjustment handle 108 may include a body portion 111 defining an aperture 112. The aperture 112 may include internal threading 113. The internal threading 113 may be dimensioned to correspond to the exterior threading 110 of the shaft portion 109 of the adjustment assembly 104 such that the aperture 112 of the adjustment handle 108 may receive the shaft portion 109. The adjustment handle 108 may further include one or more flanged portions 114 and/or a body portion 111 having a non-cylindrical exterior surface (e.g. hexagonal) to enable a user to rotate (e.g. via hand or via a tool (e.g. a crescent wrench)) the adjustment handle 108 about an axis defined by the shaft portion 109. Such rotation may adjust to position of the adjustment handle 108 along the length of the shaft portion 109 to incrementally adjust the length of the wheel traction device 100 to tighten or loosen the wheel traction device 100 relative to the wheel assembly 101 and the wheel disk 107.

Referring again to FIG. 3, the adjustment assembly 104 may further include a receiver portion 115 (e.g. a hook) which is operably coupled to the shaft portion 109. The receiver portion 115 may define a recess 116. The recess 116 may be configured to receive and retain the linkage 102 so as to couple the linkage 102 to the adjustment assembly 104. In embodiment, the linkage 102 may be a chain and the recess 116 of the receiver portion 115 may be dimensioned such that a first link of the chain may fit into the recess 116 (e.g. the thickness of the chain link is just slightly smaller than the recess 116) while a subsequent chain link will not pass through the recess 116 when the first link is within the recess 116 (e.g. the width of the subsequent link is larger than the recess 116. Alternately, the receiver portion 115 and recess 116 may be dimensioned such that a link of the chain may fit around the receiver portion 115.

Further, as shown in FIG. 3, the shaft portion 109 of adjustment assembly 104 may be coupled to the receiver portion 115 via a bracket portion 117. For example, the bracket portion 117 may be rectangular tube where the shaft portion 109 may be coupled (e.g., cooperatively threaded, bonded or welded) to an inside surface of the rectangular tube. The receiver portion 115 may be coupled to an outside surface of the rectangular tube. Further, a plate 118 may also be coupled to the bracket portion 117. When the wheel traction device 100 is affixed to the wheel assembly 101 (e.g.

as shown in FIGS. 1 and 2), the plate 118 may be positioned to abut the wheel assembly 101 so as to prevent twisting of the adjustment assembly 104.

Still further, as shown in FIG. 3. The adjustment assembly 104 may include a locking collar 119. The locking collar 119 may limit the position of the adjustment handle 108 relative to the shaft portion 109. For example, the locking collar 119 may include a threaded portion configured to receive and end portion of the shaft portion 109. Further, the locking collar 119 may include a set screw 120 which may engage the shaft portion 109 through an aperture in the locking collar 119 to retain the locking collar 119 in a fixed position relative to the shaft portion 109 and the adjustment handle 108.

Figure 5:
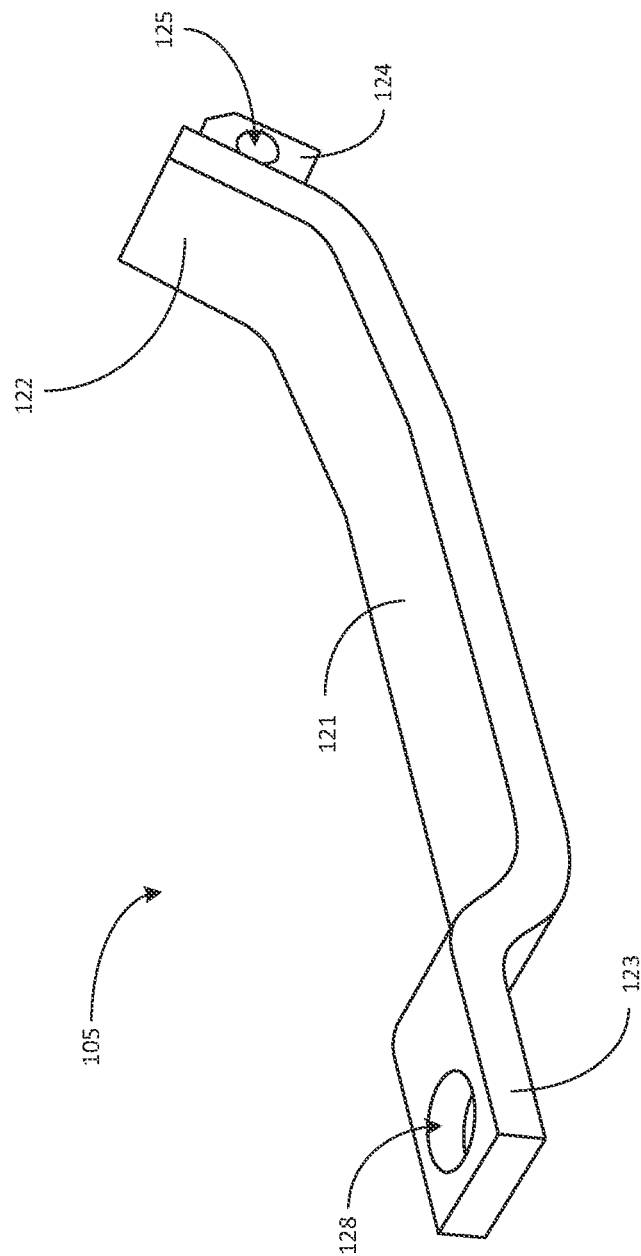
FIG. 5 shows components of a wheel traction system.

Referring now to FIG. 5, the stabilization bar 105 may include a medial portion 121, a first end portion 122 and a second end portion 123. The medial portion 121 may be substantially linear in shape and have a length approximating a tread width of the wheel assembly 101 or a depth of the wheel disk 107.

Figure 7:
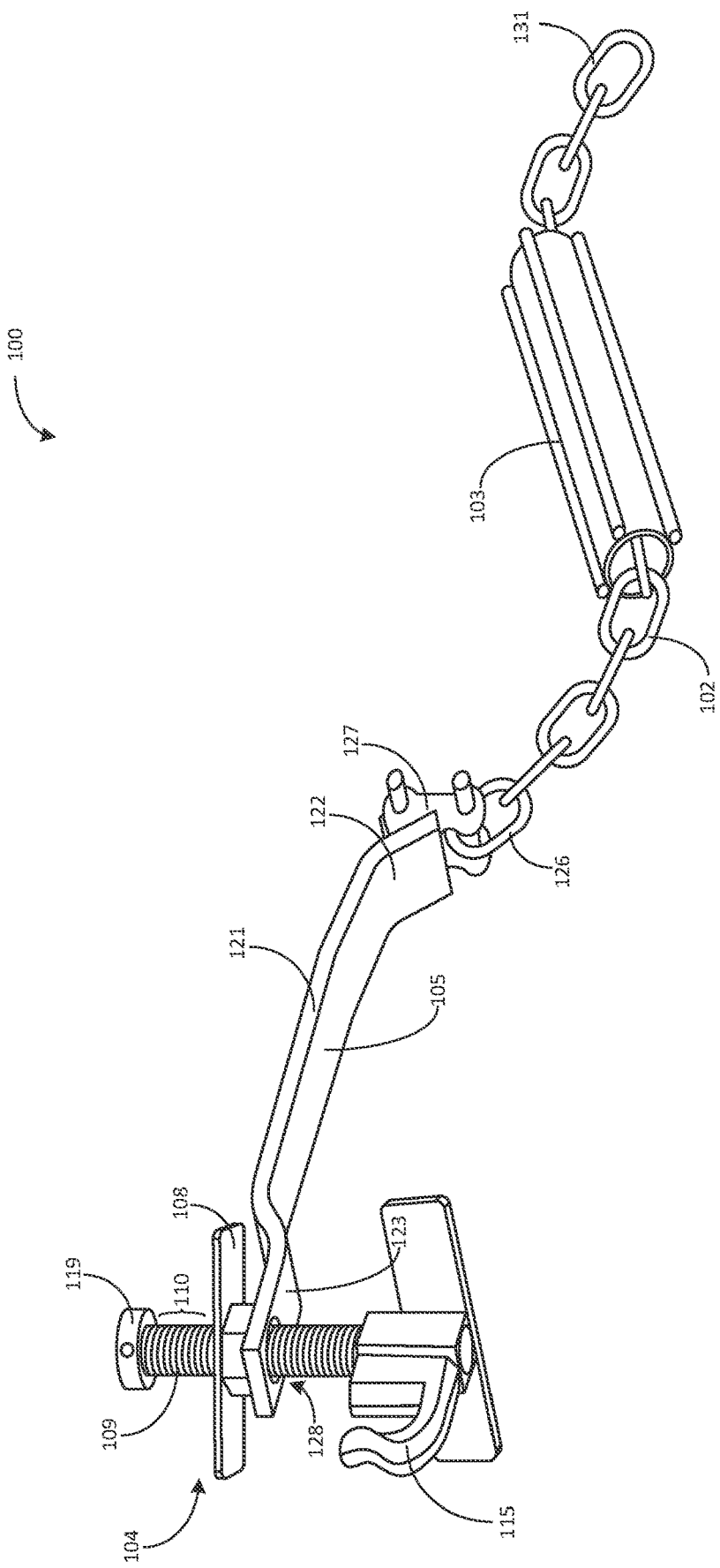
FIG. 7 shows components of a wheel traction system.

Referring again to FIG. 5, the first end portion 122 may be continuous with or offset from the first end portion 122. The first end portion 122 may be either co-planar with or angled with respect to the medial portion 121. The first end portion 122 may further include a flanged portion 124. The flanged portion 124 may extend in a direction orthogonal to the second end portion 123. The flanged portion 124 may include an aperture 125. As shown in FIGS. 7 and 8, the first end portion 122 of the of the stabilization bar 105 may be coupled to a first end 126 of the linkage 102 via the aperture 125 of the flanged portion 124. For example, a connector 127 (e.g. a doubled ended clevis connector) may be coupled to both the flanged portion 124 of the stabilization bar 105 and a chain link at the first end 126 of the linkage 102.

Referring again to FIG. 5, the second end portion 123 of the stabilization bar 105 may be continuous with or offset from the medial portion 121. The second end portion 123 may be either co-planar with or angled with respect to the medial portion 121. The second end portion 123 may include an aperture 128. As shown in FIGS. 2, 7 and 8, the aperture 128 may be dimensioned to fit around the shaft portion 109 of the adjustment assembly 104 and be held in place relative to the shaft portion 109 by the adjustment handle 108.

Figure 6:
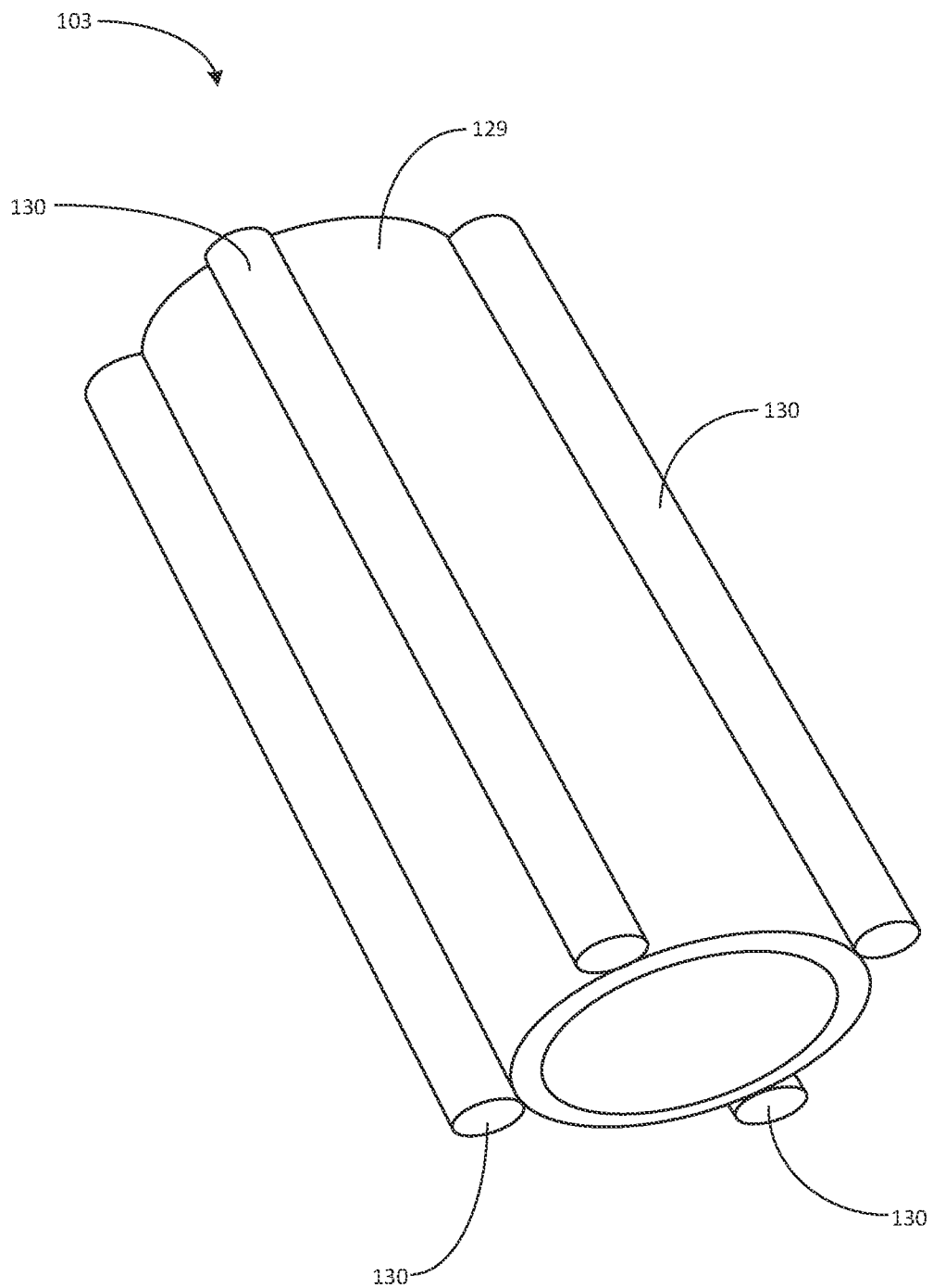
FIG. 6 shows components of a wheel traction system.

Referring to FIG. 6, the traction segment 103 may include a tubular portion 129 (e.g. a 2" diameter steel tube). The tubular portion 129 have a cylindrical or non-cylindrical cross-section. The internal diameter of the tubular portion 129 may be dimensioned such that the linkage 102 may be routed through the tubular portion 129. The traction segment 103 may further include one or more rods 130 (e.g. ⅜" steel rods) affixed to the outside of the tubular portion 129.

Referring to FIGS. 1-2 and 7-8, as noted above, the shaft portion 109 of the adjustment assembly 104 may be routed through the aperture 128 of the stabilization bar 105. The internal threading 113 of the adjustment handle 108 may then be rotated about the exterior threading 110 of the shaft portion 109 to couple the adjustment handle 108 to the shaft portion 109. The locking collar 119 may then be fixed to the end of the shaft portion 109 to retain the stabilization bar 105 and the adjustment handle 108 on the shaft portion 109.

The first end 126 of the linkage 102 may be coupled to the stabilization bar 105 via the connector 127. A second end 131 of the linkage 102 and the stabilization bar 105 may be routed through the opening 106 of the wheel disk 107 such that the stabilization bar 105 is disposed in a position adjacent to the wheel disk 107. The second end 131 of the linkage 102 may then be routed through the traction segment 103. The second end 131 linkage 102 may then be coupled to the receiver portion 115 of the adjustment assembly 104. The adjustment handle 108 may then be rotated to draw the linkage 102 and traction segment 103 tight against the tread surface of the wheel assembly 101.

Figure 9:
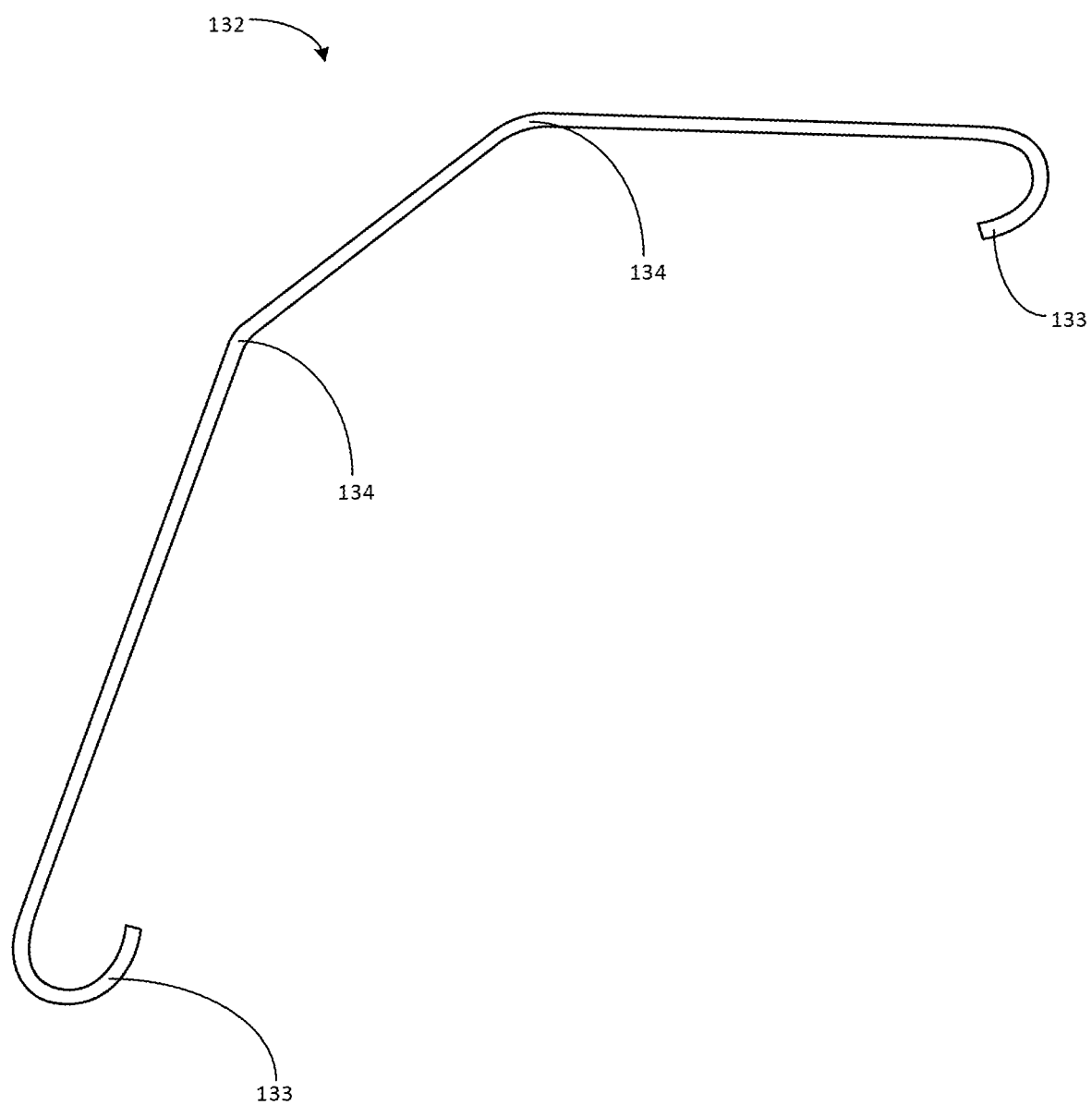
FIG. 9 shows components of a wheel traction system.

Referring now to FIG. 9, a tool 132 for facilitating installation of the wheel traction device 100 is shown. The tool 132 may be configured to assist a user in routing the stabilization bar 105 and/or the linkage 102 through the opening 106 of the wheel disk 107. The tool 132 may be inserted from the wheel well of the vehicle through the opening 106 of the wheel disk 107 to the outside of the wheel assembly 101. There it may be coupled to the stabilization bar 105 and/or the linkage 102. For example, the tool 132 may include one or more hook portions 133 configured to engage the aperture 128 of the stabilization bar 105 and/or a link at the second end 131 of the linkage 102. The tool 132 may then be withdrawn back through the opening 106 of the wheel disk 107 to pull the stabilization bar 105 and/or the linkage 102 through the opening 106 of the wheel disk 107. The tool 132 may include one or more angled portions 134. Such angled portions 134 may facilitate routing of the tool 132 through the opening 106.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A wheel traction device comprising:
   a linkage configured to at least partially encircle a ground-engaging surface of a vehicle wheel;
   a stabilization bar operably coupleable to a first end of the linkage; and
   an adjustment assembly operably coupleable to a second end of the linkage, the adjustment assembly configured to apply a tension to the linkage,
   wherein the adjustment assembly includes:
      a threaded shaft portion; and
      a threaded adjustment handle configured to engage the threaded shaft portion, and
   wherein the stabilization bar includes at least one aperture configured to receive the threaded shaft portion of the adjustment assembly.

2. The wheel traction device of claim 1, wherein the linkage includes:
   at least one of a chain or a steel cable.

3. The wheel traction device of claim 1, wherein the adjustment assembly includes:
   at least one receiver assembly configured to couple the linkage to the adjustment assembly.

4. The wheel traction device of claim 3, wherein the at least one receiver assembly includes:
   a hook.

5. The wheel traction device of claim 1, wherein the adjustment assembly includes:
   at least one plate configured to abut the vehicle wheel so as to restrict twisting of at least one of the adjustment assembly or the linkage.

6. The wheel traction device of claim 1, wherein the stabilization bar includes:
   at least a first portion, and
   at least a second portion disposed at an angle relative to the first portion.

7. The wheel traction device of claim 1, further comprising:
   a traction segment configured to be retained against the ground-engaging surface of the vehicle wheel by the linkage.

8. The wheel traction device of claim 7, wherein the traction segment includes:
   a tubular portion through which the linkage is routed.

9. The wheel traction device of claim 8, wherein the traction segment further includes:
   one or more rod segments coupled to an exterior surface of the tubular portion.

10. The wheel traction device of claim 1, wherein the stabilization bar is coupleable to the adjustment assembly.

11. A wheel traction device comprising:
a linkage, including at least one of a chain or a steel cable, configured to at least partially encircle a ground-engaging surface of a vehicle wheel;
a stabilization bar operably coupleable to a first end of the linkage; and
an adjustment assembly including a hook operably coupleable to a second end of the linkage, the adjustment assembly being configured to apply a tension to the linkage,
wherein the stabilation bar is configured to be routed through an aperture in a wheel disk of the vehicle wheel;
wherein the stabilization bar is configured to be coupled to the adjustment assembly on a first side of the wheel disk of the vehicle wheel, and
wherein the stabilization bar is configured to be coupled to the linkage on a second side of the wheel disk of the vehicle wheel.

* * * * *